(12) United States Patent
Jackson

(10) Patent No.: X8248
(45) Date of Patent: Jun. 14, 1834

(54) CUTTING WHEAT

(76) Inventor: Bernard Jackson

Bernard Jackson. of Brown County Ohio

Letters Patent.

The Schedule referred to in these Letters Patent and making part of the same containing a description in the words of the said Bernard Jackson himself of his improvement in the machine for cutting & cradling Wheat or any other Grain To all to whom these presents shall come. Be it known that I Bernard Jackson of the County of Brown and State of Ohio have invented a new and useful improvement in cutting or cradling Wheat or any other grain, and that the following is a full and exact description of the construction and operation of the said machine as invented or improved by me. A triangular frame is to be constructed of wood of about six feet broad. by about ten feet long on that arm at the point or extremity of which. the animal power is to be applied. The third or longest side is to be bent to an elbow or angle of the same inclination as the two outer sides presenting the appearance of a platform. shaped as an elbow. there are to be two of these frames, one to be supported in an upright position over the other. the lower may be boarded over in order to carry weights. should it be found necessary and the point coupled into the fore wheels of a waggon or any other answering the purpose. from the axle of which the tongue or shafts are to project by which the animals are to be confined and driven. about half way down the side, terminating in the point is to be a stud about four and a half feet high. and another at the point for the purpose of supporting the upper frame. and between these studs will be a rod with a nut and screw for the purpose of drawing the frames securely together on the studs. at the back of this frame or on the shortest side. is to be secured at each end a collar to receive the ends of an axis, or bar of iron to revolve therein. having on its extreme ends a bevel wheel secured to each. answering the end of supporting the frame, and communicating the motion to the scythes and discharging fingers. These wheels may be roughened on their circumference in order to prevent slipping. and of about twelve inches in diameter. At about twelve inches along said axis and on the right side of the tongue. will be a step for the reception of the end of a shaft rising perpendicularly and working through the top frame, of about two inches square. having at the lower end a bevel wheel of twenty four working into the small wheel. Into the top of this wheel are to be firmly secured four scythes, atright angles with each other projecting from the sides at the square shaft in the same plane so that the fingers may be secured on said side above the blades. at the other extremity of the axis above described. a shaft also rises from the lower frame, working in a step or socket below. and through the top of the upper frame. the lower end has secured to it a bevel wheel working in the small one. and of the same size twelve inches. Nearly half way up this shaft a pin is to pass through it and also through an arm hung on each side of the shaft leaving more of the arm above this point than below it, and having at its shorter end a weight to cause it to fall to its place. or a spring secured at the centre to produce the same effect. along this arm will be inserted three or more discharging fingers which by the revolution of the small wheels below follow with double the speed of the cradle fingers and discharge the grain as cut behind the left side of the machine.

This effect is produced of discharging the straw by means of an inclination rising from the back of the frame directly under the arms so that in their motion round their shaft they must necessarily pass over this inclination and on rising the straw falls. the spring or weight brings them to their place again ready for another stroke. A Rake may when required be attached to the back of the machine, and worked in the following manner. To the top of the discharging shaft. above the top frame, must be secured a horizontal bevel wheel, and working in it a vertical bevel wheel having projecting pins rising from the face so calculated as to lift the arm of the Rake at each period of the revolution of the wheel from pin to pin My claim is for this method and combination of machinery for cutting grain in the straw. I do not claim for the Rake but the manner of working it.

In testimony that the above is a true description of my machine as invented & to be used by me I have hereunto set my hand this eleventh day of June Eighteen Hundred and thirty four Bernard Jackson Exd. Witnesses W.H.E. Henry Stone Robt Clark